United States Patent
Kousaka et al.

(10) Patent No.: US 10,947,365 B2
(45) Date of Patent: Mar. 16, 2021

(54) TRANSPARENT PLASTIC SUBSTRATE AND PLASTIC LENS

(71) Applicant: HOYA LENS THAILAND LTD., Patumthani (TH)

(72) Inventors: Masahisa Kousaka, Hachioji (JP); Natsumi Tasaki, Akishima (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 0 days.

(21) Appl. No.: 16/113,673

(22) Filed: Aug. 27, 2018

(65) Prior Publication Data

US 2018/0362731 A1 Dec. 20, 2018

Related U.S. Application Data

(62) Division of application No. 15/025,440, filed as application No. PCT/JP2014/075963 on Sep. 29, 2014, now abandoned.

(30) Foreign Application Priority Data

Sep. 30, 2013 (JP) ................................. 2013-205517

(51) Int. Cl.
*G02B 1/04* (2006.01)
*G02B 5/22* (2006.01)
*C08K 5/3475* (2006.01)
*C08L 101/00* (2006.01)

(52) U.S. Cl.
CPC .......... *C08K 5/3475* (2013.01); *C08L 101/00* (2013.01); *G02B 1/04* (2013.01); *G02B 1/041* (2013.01); *G02B 5/22* (2013.01); *G02B 5/223* (2013.01)

(58) Field of Classification Search
CPC . G02B 1/04; G02B 1/041; G02B 5/22; C08K 5/3475; C08L 101/00
USPC ....................................................... 524/720
See application file for complete search history.

(56) References Cited

U.S. PATENT DOCUMENTS

| | | | |
|---|---|---|---|
| 6,187,844 B1 | 2/2001 | Murata | |
| 6,187,845 B1 | 2/2001 | Renz et al. | |
| 6,245,915 B1 | 6/2001 | Wood et al. | |
| 6,268,415 B1 | 7/2001 | Renz et al. | |
| 6,770,692 B1 | 8/2004 | Kobayashi et al. | |
| 7,811,481 B2 * | 10/2010 | Kato | G02B 3/00 264/1.32 |
| 8,044,165 B2 | 10/2011 | Kawaguchi et al. | |
| 8,097,190 B2 | 1/2012 | Jang et al. | |
| 2001/0011113 A1 | 8/2001 | Wood et al. | |
| 2003/0176542 A1 | 9/2003 | Abe et al. | |
| 2007/0179252 A1 | 8/2007 | Lamberts et al. | |
| 2008/0094704 A1 | 4/2008 | Kimura et al. | |
| 2009/0029172 A1 | 1/2009 | Isozaki | |
| 2009/0066911 A1 | 3/2009 | Ishizaki et al. | |
| 2009/0225425 A1 | 9/2009 | Jang et al. | |
| 2009/0297807 A1 | 12/2009 | Kojima et al. | |
| 2010/0010192 A1 | 1/2010 | Kawaguchi et al. | |
| 2010/0014048 A1 | 1/2010 | Kousaka | |
| 2010/0040801 A1 | 2/2010 | Mitsuishi et al. | |
| 2010/0130661 A1 * | 5/2010 | Takeuchi | C08F 12/30 524/419 |
| 2011/0033681 A1 | 2/2011 | Adachi et al. | |
| 2011/0075096 A1 | 3/2011 | Ishak et al. | |
| 2015/0370094 A1 | 12/2015 | Hashimoto et al. | |
| 2016/0215121 A1 | 7/2016 | Kousaka et al. | |
| 2018/0362730 A1 | 12/2018 | Kousaka et al. | |
| 2018/0362731 A1 | 12/2018 | Kousaka et al. | |

FOREIGN PATENT DOCUMENTS

| | | |
|---|---|---|
| CN | 101120052 A | 2/2008 |
| CN | 101712742 A | 5/2010 |
| CN | 101712743 A | 5/2010 |
| CN | 101984758 A | 3/2011 |
| JP | H05-105772 A | 4/1993 |
| JP | H08-29741 A | 2/1996 |
| JP | H08-208792 A | 8/1996 |
| JP | H10-186291 A | 7/1998 |
| JP | H11-271501 A | 10/1999 |
| JP | H11-295502 A | 10/1999 |
| JP | 2001-089653 A | 4/2001 |
| JP | 2001-131420 A | 5/2001 |
| JP | 2001-243915 A | 9/2001 |
| JP | 2003-107202 A | 4/2003 |
| JP | 2003-231804 A | 8/2003 |
| JP | 2003-253140 A | 9/2003 |
| JP | 2004-051851 A | 2/2004 |
| JP | 2004-061879 A | 2/2004 |
| JP | 2004-131652 A | 4/2004 |
| JP | 2004-325511 A | 11/2004 |
| JP | 2005-023294 A | 1/2005 |
| JP | 2005-292240 A | 10/2005 |
| JP | 2006-235587 A | 9/2006 |
| JP | 2007-254734 A | 10/2007 |
| JP | 2008-056854 A | 3/2008 |
| JP | 2008-088195 A | 4/2008 |
| JP | 2008-090327 A | 4/2008 |
| JP | 2008-105225 A | 5/2008 |
| JP | 2012-093689 A | 5/2012 |
| JP | 2012-167199 A | 9/2012 |
| JP | 2012-173704 A | 9/2012 |
| JP | 2012173704 A * | 9/2012 |
| JP | 2012-219169 A | 11/2012 |

(Continued)

OTHER PUBLICATIONS

Ciba Specialty Chemicals Inc.; "Ciba® Tinuvin® 326;" Plastic Additives; p. 1-2; Oct. 1966.

(Continued)

*Primary Examiner* — Kelechi C Egwim
(74) *Attorney, Agent, or Firm* — Oliff PLC

(57) ABSTRACT

To provide a transparent plastic substrate having a high cut rate of blue light, a plastic lens and a transparent plastic member. A transparent plastic substrate containing a benzotriazole compound represented by the formula (1), a plastic lens containing the transparent plastic substrate, and a transparent plastic member containing a benzotriazole compound represented by the formula (1).

3 Claims, No Drawings

(56) References Cited

FOREIGN PATENT DOCUMENTS

| | | | | |
|---|---|---|---|---|
| JP | 2012219169 | A | * | 11/2012 |
| JP | 2016-183345 | A | | 10/2016 |
| JP | 2016-184172 | A | | 10/2016 |
| KR | 2009-0013421 | A | | 2/2009 |
| KR | 20120060254 | A | | 6/2012 |
| KR | 2012-0095817 | A | | 8/2012 |
| KR | 20120092729 | A | | 8/2012 |
| VN | 10010596 | B | * | 9/2012 |
| WO | 00/66676 | A1 | | 11/2000 |
| WO | 2006/087880 | A1 | | 8/2006 |
| WO | 2008/029994 | A1 | | 3/2008 |
| WO | 2008/072580 | A1 | | 6/2008 |
| WO | 2010076942 | A1 | | 7/2010 |
| WO | 2010128770 | A2 | | 11/2010 |
| WO | 2013/160227 | A1 | | 10/2013 |
| WO | 2014/133111 | A1 | | 9/2014 |
| WO | 2015-046540 | A1 | | 4/2015 |

OTHER PUBLICATIONS

Toru Haruna; "Ultraviolet Absorber;" Polymer Additives Handbook; Nov. 7, 2010; p. 1-13.
Apr. 7, 2020 Office Action issued in U.S. Appl. No. 16/113,603.
Apr. 30, 2020 Notice of Allowance issued in U.S. Appl. No. 16/222,577.
BASF, The Chemical Company, Plastic Additives, "Tinuvin® 234, Low Volatile Benzotriazole UV Absorber," pp. 1-3, Aug. 2010.
Dec. 7, 2020 Communication pursuant to Rule 114(2) EPC issued in European Patent Application No. 18211290.4.

* cited by examiner

TRANSPARENT PLASTIC SUBSTRATE AND PLASTIC LENS

This is a Division of application Ser. No. 15/025,440 filed Mar. 28, 2016, which in turn is a National Stage Entry of PCT/JP2014/075963 filed on Sep. 29, 2014, which claims the benefit of Japanese Patent Application No. 2013-205517 filed Sep. 30, 2013. The disclosure of the prior applications is hereby incorporated by reference herein in its entirety.

FIELD OF INVENTION

The present invention relates to a transparent plastic substrate, a plastic lens, and a transparent plastic member, and particularly relates to a transparent plastic substrate and a plastic lens that have a high cut rate of blue light.

BACKGROUND ART

In a transparent plastic substrate and a plastic lens, the glare can be reduced, and the visibility and the contrast can be enhanced, by cutting a light ray in the blue region (having a wavelength range of from 380 to 500 nm). With respect to the health of eyes, a light ray in the blue region (380 to 500 nm) has large energy and thus is said to be a factor damaging retina and the like. The damage due to blue light is referred to as "blue light hazard", and light in the low wavelength side around from 380 to 420 nm is the most dangerous, and the light in the region is said to be desirably cut.

For solving the problem, for example, PTL 1 proposes a lens having a multilayer film disposed on a convex surface of a plastic member, in which the multilayer film has an average reflectance of from 2 to 10% in a wavelength range of from 400 to 500 nm. However, the cut rate of blue light measured for the lens is approximately 30%.

PTL 2 describes a polymerizable composition for a lens that contains a benzotriazole ultraviolet ray absorbent and is enhanced in light cut rate.

CITATION LIST

Patent Literatures

PTL 1: JP-A-2012-093689
PTL 2: JP-A-2008-056854

SUMMARY OF INVENTION

Technical Problem

An object of the present invention is to provide a transparent plastic substrate having a high cut rate of blue light, and a plastic lens and a transparent plastic member, each containing the same.

Solution to Problem

As a result of earnest investigations made by the present inventors for achieving the object, it has been found that the object can be achieved by adding an ultraviolet ray absorbent containing a benzotriazole compound having a particular structure containing a group imparting a mesomeric effect into a transparent plastic substrate, and thus the present invention has been completed.

The present invention thus provides the following items [1] to [3].

[1] A transparent plastic substrate containing a benzotriazole compound represented by the following formula (1):

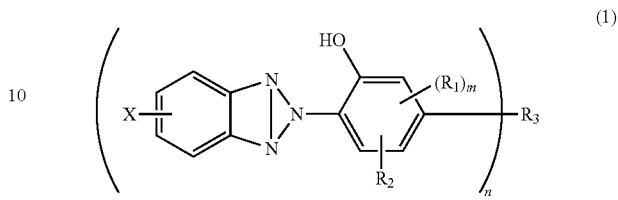

wherein $R_1$ represents an alkyl group having from 1 to 3 carbon atoms or an alkoxy group having from 1 to 3 carbon atoms; m represents an integer of 0 or 1; $R_2$ represents an alkyl group having from 1 to 12 carbon atoms or an alkoxy group having from 1 to 12 carbon atoms; $R_3$ represents a hydrogen atom or a divalent hydrocarbon group having from 1 to 8 carbon atoms; n represents a valence of the group represented by $R_3$, which is 1 or 2, provided that in the case where m is 1, $R_1$ and $R_2$ may be the same as or different from each other; and X represents a group imparting a mesomeric effect.

[2] A plastic lens containing the transparent plastic substrate according to the item [1].

[3] A transparent plastic member containing the benzotriazole compound represented by the formula (1).

Advantageous Effects of Invention

According to the present invention, a transparent plastic substrate having a high cut rate of blue light, and a plastic lens and a transparent plastic member, each containing the same, can be provided.

DESCRIPTION OF EMBODIMENTS

The transparent plastic substrate of the present invention contains the benzotriazole compound represented by the formula (1) as an ultraviolet ray absorbent.

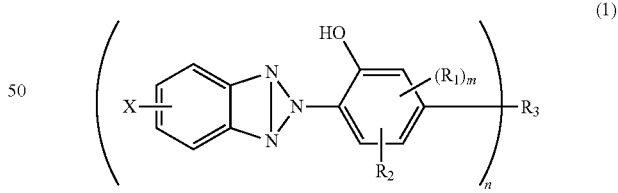

In the formula (1), X represents a group imparting a mesomeric effect. It is expected that the group imparting a mesomeric effect present on the benzotriazole ring enhances the cut rate of blue light.

The substitution position of X is preferably the 5-position of the triazole ring.

Examples of X include a chlorine atom, a bromine atom, a fluorine atom, an iodine atom, a sulfo group, a carboxyl group, a nitrile group, an alkoxy group, a hydroxyl group and an amino group, and among these, a chlorine atom, a bromine atom and a fluorine atom are preferred, and a chlorine atom is more preferred.

In the formula (1), $R_2$ represents an alkyl group having from 1 to 12 carbon atoms or an alkoxy group having from 1 to 12 carbon atoms, and for each of the alkyl group and the alkoxy group, the number of carbon atoms is preferably from 1 to 8, more preferably from 2 to 8, and further preferably from 4 to 8.

The alkyl group and the alkoxy group each may be branched or linear. Among the alkyl group and the alkoxy group, the alkyl group is preferred.

Examples of the alkyl group include a methyl group, an ethyl group, a n-propyl group, an isopropyl group, a n-butyl group, a sec-butyl group, a tert-butyl group, a pentyl group, a hexyl group, a heptyl group, a n-octyl group, a 1,1,3,3-tetramethylbutyl group, a nonyl group, a decyl group, an undecyl group and a dodecyl group, and among these, at least one selected from a n-propyl group, an isopropyl group, a n-butyl group, a sec-butyl group, a tert-butyl group and a 1,1,3,3-tetramethylbutyl group is preferred, a n-butyl group, a sec-butyl group, a tert-butyl group and a 1,1,3,3-tetramethylbutyl group are more preferred, and a tert-butyl group is further preferred.

Examples of the alkoxy group include a methoxy group, an ethoxy group, a propoxy group, a butoxy group, a pentyloxy group, a hexyloxy group, a heptyloxy group, an octyloxy group, a nonyloxy group, a decyloxy group, an undecyloxy group and a dodecyloxy group, and among these, a butoxy group and an ethoxy group are preferred.

In the formula (1), the substitution position of $R_2$ is preferably the 3-position, the 4-position or the 5-position with respect to the substitution position of the benzotriazolyl group.

In the formula (1), $R_1$ represents an alkyl group having from 1 to 3 carbon atoms or an alkoxy group having from 1 to 3 carbon atoms, and specific examples thereof include the groups described for $R_2$ that conform in the number of carbon atoms. Among the groups, a methyl group and an ethyl group are preferred. In the case where $R_1$ is one of these groups, an excellent cut rate of blue light is obtained. In the case where the number of carbon atoms of $R_1$ is 4 or more (for example, 2-(3,5-di-t-butyl-2-hydroxyphenyl)-5-chlorobenzotriazole), the compound is a persistent compound, which has a large environment load and may bring possible influence to human body, and thus may be designated as a manufacturing prohibited substance in some cases. However, the compound of the formula (1) can be decomposed relatively easily, and also has an advantage of less influence on human body.

In the formula (1), m represents an integer of 0 or 1.

In the formula (1), the substitution position of $R_2$ is preferably the 5-position with respect to the substitution position of the benzotriazolyl group.

In the formula (1), $R_3$ represents a hydrogen atom or a divalent hydrocarbon group having from 1 to 8 carbon atoms, and among these, a hydrogen atom is preferred.

Examples of the hydrocarbon group represented by $R_3$ include an aliphatic hydrocarbon group and an aromatic hydrocarbon group.

The hydrocarbon group represented by $R_3$ preferably has from 1 to 8 carbon atoms, and more preferably from 1 to 3 carbon atoms.

Examples of the divalent hydrocarbon group represented by $R_3$ include a methanecliyl group, an ethanecliyl group, a propanecliyl group, a benzenecliyl group and toluenediyl group, and among these, a methanecliyl group is preferred.

n represents a valence of the group represented by $R_3$, which is 1 or 2.

In the formula (1), the substitution position of $R_3$ is preferably the 3-position with respect to the substitution position of the benzotriazolyl group.

$R_3$ preferably represents a hydrogen atom, and in this case, n is 1.

The triazole compound is preferably a compound represented by the following formula (1-1):

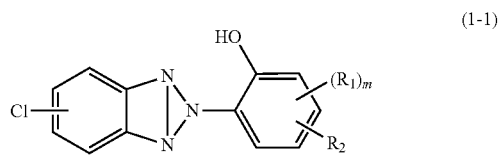

In the formula, $R_1$, $R_2$ and m are the same as the examples and the preferred embodiments described above.

Specific examples of the benzotriazole compound represented by the formula (1) include methylenebis(3-(5-chloro-2-benzotriazolyl)-5-(1,1,3,3-tetramethylbutyl)-2-hydroxyphenyl), methylenebis(3-(5-chloro-2-benzotriazolyl)-5-(tert-butyl)-2-hydroxyphenyl), methylenebis(3-(5-chloro-2-benzotriazolyl)-5-tert-butyl-2-hydroxyphenyl), methylenebis(3-(5-chloro-2-benzotriazolyl)-5-tert-butyl-2-hydroxyphenyl), methylenebis(3-(5-chloro-2-benzotriazolyl)-5-ethoxy-2-hydroxyphenyl), phenylenebis(3-(5-chloro-2-benzotriazolyl)-5-(1,1,3,3-tetramethylbutyl)-2-hydroxy phenyl), and specific examples of the benzotriazole compound represented by the formula (1-1) described below.

Specific examples of the benzotriazole compound represented by the formula (1-1) include 2-(3-tert-butyl-2-hydroxy-5-methylphenyl)-5-chloro-2H-benzotriazole, 2-(3-tert-butyl-2-hydroxy-5-ethylphenyl)-5-chloro-2H-benzotriazole, 5-chloro-2-(3,5-dimethyl-2-hydroxyphenyl)-2H-benzotriazole, 5-chloro-2-(3,5-diethyl-2-hydroxyphenyl)-2H-benzotriazole, 5-chloro-2-(2-hydroxy-4-methoxyphenyl)-2H-benzotriazole, 5-chloro-2-(4-ethoxy-2-hydroxyphenyl)-2H-benzotriazole, 2-(4-butoxy-2-hydroxyphenyl)-5-chloro-2H-benzotriazole and 5-chloro-2-(2-hydroxy-4-octyloxyphenyl)-2H-benzotriazole.

Among these, 2-(3-tert-butyl-2-hydroxy-5-methylphenyl)-5-chloro-2H-benzotriazole, 2-(3-tert-butyl-2-hydroxy-5-ethylphenyl)-5-chloro-2H-benzotriazole, 5-chloro-2-(4-ethoxy-2-hydroxyphenyl)-2H-benzotriazole and 2-(4-butoxy-2-hydroxyphenyl)-5-chloro-2H-benzotriazole are preferred.

The transparent plastic substrate of the present invention preferably contains the benzotriazole compound that is used in an amount in a range of from 0.05 to 3.00 parts by mass, more preferably from 0.05 to 2.50 parts by mass, further preferably from 0.10 to 2.00 parts by mass, and still further preferably from 0.30 to 2.00 parts by mass, per 100 parts by mass of the resin component (i.e., a monomer and/or a polymer) constituting the transparent plastic substrate. The amount of the benzotriazole compound added may vary depending on the kind of the resin component, the target ultraviolet ray absorbing characteristics, and the like.

The resin component constituting the transparent plastic substrate is preferably at least one selected from the group consisting of a (thio)urethane resin, an episulfide resin, a polycarbonate resin, a polyamide resin, an acrylic resin, a vinyl resin and a polyester resin, and in the case where the transparent plastic substrate is a plastic lens, a (thio)urethane resin and/or an episulfide resin are preferred.

A (thio)urethane resin herein means at least one selected from a urethane resin and a thiourethane resin.

A monomer for forming the (thio)urethane resin in the invention is a raw material monomer for producing a polythiourethane lens or a polyurethane lens, and specific examples thereof include a combination of a polyisocyanate compound and a polythiol compound, and a combination of a polyisocyanate compound and a polyol compound.

The polyisocyanate compound is not particularly limited, and specific examples thereof include an alicyclic isocyanate compound, such as, bis(isocyanatomethyl)cyclohexane, bis(isocyanatomethyl)bicyclo[2.2.1]heptane, hydrogenated 2,6-tolylene diisocyanate, hydrogenated m- and p-phenylene diisocyanate, hydrogenated 2,4-tolylene diisocyanate, hydrogenated diphenylmethane diisocyanate, hydrogenated m-xylylene diisocyanate, hydrogenated p-xylylene diisocyanate and isophorone diisocyanate; an isocyanate compound that does not have an alicyclic ring or an aromatic ring, such as, m- and p-phenylene diisocyanate, 2,6-tolylene diisocyanate, 2,4-tolylene diisocyanate, 4,4'-diphenylmethane diisocyanate, m- and p-xylylene diisocyanate (bis(isocyanatomethyl)benzene), m- and p-tetramethylxylylene diisocyanate, 2,6-naphthalene diisocyanate, 1,5-naphthalene diisocyanate, hexamethylene diisocyanate, octamethylene diisocyanate, 2,2,4-trimethylhexamethylene diisocyanate, tetramethylene diisocyanate, a biuret reaction product of hexamethylene diisocyanate, a trimer of hexamethylene diisocyanate, lysine diisocyanate, lysine triisocyanate, 1,6,11-undecane triisocyanate and triphenylmethane triisocyanate; and a sulfur-containing isocyanate compound, such as, diphenyl disulfide-4,4'-diisocyanate, 2,2'-dimethyldiphenyl disulfide-5,5'-diisocyanate, 3,3'-dimethyldiphenyl disulfide-5,5'-diisocyanate, 3,3'-dimethyldiphenyl disulfide-6,6'-diisocyanate, 4,4'-dimethyldiphenyl disulfide-5,5'-diisocyanate, 3,3'-dimethoxydiphenyl disulfide-4,4'-diisocyanate, 4,4'-dimethoxydiphenyl disulfide-3,3'-diisocyanate, diphenylsulfone-4,4'-diisocyanate, diphenylsulfone-3,3'-diisocyanate, benzylidenesulfone-4,4'-diisocyanate, diphenylmethanesulfone-4,4'-diisocyanate, 4-methyldiphenylmethanesulfone-2,4'-diisocyanate, 4,4'-dimethoxydiphenylsulfone-3,3'-diisocyanate, 3,3'-dimethoxy-4,4'-diisocyanatodibenzylsulfone, 4,4'-dimethyldiphenylsulfone-3,3'-diisocyanate, 4,4'-di-tert-butyldiphenylsulfone-3,3'-diisocyanate, 4,4'-dimethoxybenzeneethylenesulfone-3,3'-diisocyanate, 4,4'-dichlorodiphenylsulfone-3,3'-diisocyanate, 4-methyl-3-isocyanatobenzenesulfonyl-4'-isocyanatophenol ester, 4-methoxy-3-isocyanatobenzenesulfonyl-4'-isocyanatophenol ester, 4-methyl-3-isocyanatobenzenesulfonylanilide-3'-methyl-4'-isocyanate, dibenzenesulfonyl-ethylenediamine-4,4'-diisocyanate, 4,4'-dimethoxybenzenesulfonyl-ethylenediamine-3,3'-diisocyanate, 4-methyl-3-isocyanatobenzenesulfonylanilide-4-methyl-3'-isocyanate, thiophene-2,5-diisocyanate, thiophene-2,5-diisocyanatomethyl, 1,4-dithiane-2,5-diisocyanate, 1,4-dithiane-2,5-diisocyanatomethyl, 1,4-dithiane-2,3-diisocyanatomethyl, 1,4-dithiane-2-isocyanatomethyl-5-isocyanatopropyl, 1,3-dithiolane-4,5-diisocyanate, 1,3-dithiolane-4,5-diisocyanatomethyl, 1,3-dithiolane-2-methyl-4,5-diisocyanatomethyl, 1,3-dithiolane-2,2-diisocyanatoethyl, tetrahydrothiophene-2,5-diisocyanate, tetrahydrothiophene-2,5-diisocyanatomethyl, tetrahydrothiophene-2,5-diisocyanatoethyl and tetrahydrothiophene-3,4-diisocyanatomethyl. Among these, an alicyclic isocyanate compound is preferred.

Examples of the polythiol compound include an aliphatic thiol, such as, methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, tetrakis(mercaptomethyl)methane, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, 1,1-bis(mercaptomethyl)cyclohexane, thiomalic acid bis(2-mercaptoethyl ester), 2,3-dimercaptosuccinic acid (2-mercaptoethyl ester), 2,3-dimercapto-1-propanol (2-mercaptoacetate), 2,3-dimercapto-1-propanol (3-mercaptoacetate), diethylene glycol bis(2-mercaptoacetate), diethylene glycol bis(3-merecaptopropionate), 1,2-dimercaptopropyl methyl ether, 2,3-dimercaptopropyl methyl ether, 2,2-bis(mercaptomethyl)-1,3-propanedithiol, bis(2-mercaptoethyl) ether, ethylene glycol bis(2-mercaptoaectate), ethylene glycol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate) and 1,2-bis(2-mercaptoethylthio)-3-mercaptopropane; an aromatic thiol, such as, 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,3-bis(mercaptoethyl)benzene, 1,4-bis(mercaptoethyl)benzene, 1,2-bis(mercaptomethoxy)benzene, 1,3-bis(mercaptomethoxy)benzene, 1,4-bis(mercaptomethoxy)benzene, 1,2-bis(mercaptoethoxy)benzene, 1,3-bis(mercaptoethoxy)benzene, 1,4-bis(mercaptoethoxy)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 1,2,3-tris(mercaptomethoxy)benzene, 1,2,4-tris(mercaptomethoxy)benzene, 1,3,5-tris(mercaptomethoxy)benzene, 1,2,3-tris(mercaptoethoxy)benzene, 1,2,4-tris(mercaptoethoxy)benzene, 1,3,5-tris(mercaptoethoxy)benzene, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 1,2,3,4-tetrakis(mercaptoethyl)benzene, 1,2,3,5-tetrakis(mercaptomethoxy)benzene, 1,2,4,5-tetrakis(mercaptomethoxy)benzene, 1,2,3,4-tetrakis(mercaptoethoxy)benzene, 1,2,3,5-tetrakis(mercaptoethoxy)benzene, 1,2,4,5-tetrakis(mercaptoethoxy)benzene, 2,2'-dimercaptobiphenyl, 4,4'-dimercaptobiphenyl, 4,4'-dimercaptobibenzyl, 2,5-toluenedithiol, 3,4-toluenedithiol, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracenedimethanethiol, 1,3-di(β-methoxyphenyl)propane-2,2-dithiol, 1,3-diphenylpropane-2,2-dithiol, phenylmethane-1,1-dithiol and 2,4-di(β-mercaptophenyl)pentane; a halogen-substituted aromatic thiol, including a chlorine-substituted compound and a bromine-substituted compound, such as, 2,5-dichlorobenzene-1,3-dithiol, 1,3-di(β-chlorophenyl)propane-2,2-dithiol, 3,4,5-tribromo-1,2-dimercaptobenzene and 2,3,4,6-tetrachloro-1,5-bis(mercaptomethyl)benzene; an aromatic thiol containing a sulfur atom other than a mercapto group, such as, 1,2-bis(mercaptomethylthio)benzene, 1,3-bis(mercaptomethylthio)benzene, 1,4-bis(mercaptomethylthio)benzene, 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio)benzene, 1,3,5-tris(mercaptoethylthio)benzene, 1,2,3,4-tetrakis(mercaptomethylthio)benzene, 1,2,3,5-tetrakis(mercaptomethylthio)benzene, 1,2,4,5-tetrakis(mercaptomethylthio)benzene, 1,2,3,4-tetrakis(mercaptoethylthio)benzene, 1,2,3,5-tetrakis(mercaptoethylthio)benzene, 1,2,4,5-tetrakis(mercaptoethylthio)benzene, and nuclear alkylated compounds thereof; an aliphatic thiol containing a sulfur atom other than a mercapto group, such as, bis(mercaptomethyl) sulfide, bis(mercaptoethyl) sulfide, bis(mercaptopropyl) sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,3-bis(mercaptomethylthio)propane, 1,3-bis(2-mercaptoethylthio)propane, 1,3-bis(3-mercaptopropylthio)propane, 1,2-bis(2-mercaptoethylthio)-3-mercaptopropane, 2-mercaptoethylthio-1,3-propanedithiol, 1,2,3-tris(mercaptomethylthio)propane, 1,2,3-tris(2-mercaptoethylthio)propane, 1,2,3-tris(3-mercaptopropylthio)propane, tetrakis(mercaptomethythiomethyl)methane, tetrakis(2-mercaptoethylthiomethyl)methane, tetrakis(3-mercaptopropylthiomethyl)methane, bis(2,3-dimercaptopropyl) sulfide, 2,5-dimercapto-1,4-dithiane, bis(mercaptomethyl) disulfide, bis(mercaptoethyl) disulfide, bis(mercaptopropyl) disulfide, and esters of these compounds with thioglycolic acid and mercaptopropionic acid, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropyonate), hydroxypropyl sulfide bis(2-mercaptoacetate), hydroxypropyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), hydroxypropyl disulfide bis(2-mercaptoacetate), hydroxypropyl disulfide bis(3-mercaptopropionate), 2-mercaptoethyl ether bis(2-mercaptoacetate), 2-mercaptoethyl ether bis(3-mercaptopropionate), 1,4-dithiane-2,5-diol bis(2-mercaptoacetate), 1,4-dithiane-2,5-diol bis(3-mercaptopropionate), thioglycolic acid (2-mercaptoethyl ester), thiodipropionic acid bis(2-mercaptoethyl ester), 4,4'-thiodibutyric acid bis(2-mercaptoethyl ester), dithiodiglycolic acid bis(2-mercaptoethyl ester), dithiodipropionic acid bis(2-mercaptoethyl ester), 4,4'-dithiodibtyric acid bis(2-mercaptoethyl ester), thiodiglycolic acid bis(2,3-dimercaptopropyl ester), thiodipropionic acid bis(2,3-dimercaptopropyl ester), dithiodiglycolic acid bis(2,3-dimercaptopropyl ester), dithiodipropionic acid bis(2,3-dimercaptopropyl ester), 4-mercaptomethyl-3,6-dithiaoctane-1,8-dithiol, bis(mercaptomethyl)-3,6,9-trithia-1,11-undecanedithiol and bis(1,3-dimercapto-2-propyl) sulfide; and a heterocyclic compound containing a sulfur atom other than a mercapto group, such as, 3,4-thiophenedithiol, tetrahydrothiophene-2,5-dimercaptomethyl, 2,5-dimercapto-1,3,4-thiadiazole, 2,5-dimercapto-1,4-dithiane and 2,5-dimercaptomethyl-1,4-dithiane.

Examples of the polyol compound include an aliphatic polyol, such as, ethylene glycol, diethylene glycol, propylene glycol, dipropylene glycol, butylene glycol, neopentyl glycol, glycerin, trimethylolethane, trimethylolpropane, butanetriol, 1,2-methylglycoside, pentaerythritol, dipentaerythritol, tripentaerythritol, triethylene glycol, polyethylene glycol, tris(2-hydroxyethyl) isocyanurate, cyclobutanediol, cyclopentanediol, cyclohexanediol, cycloheptanediol, cyclooctanediol, bicyclo[4.3.0]nonanediol, dicyclohexanediol, tricyclo[5.3.1.1]dodecanediol, spiro[3.4]octanediol and butylcyclohexanediol; an aromatic polyol, such as, dihydroxynaphthalene, trihydroxynaphthalene, tetrahydroxynaphthalene, dihydroxybenzene, benzenetriol, trihydroxyphenanthrene, bisphenol A, bisphenol F, xylylene glycol and tetrabromobisphenol A, and addition reaction products of these compounds with an alkylene oxide, such as, ethylene oxide and propylene oxide; bis(4-(hydroxyethoxy)phenyl) sulfide, bis(4-(2-hydroxypropoxy)phenyl) sulfide, bis(4-(2,3-dihydroxypropoxy)phenyl) sulfide, bis(4-(4-hydroxycyclohexyloxy)phenyl) sulfide, bis(2-methyl-4-(hydroxyethoxy)-6-butylphenyl) sulfide, and these compounds having ethylene oxide and/or propylene oxide added thereto in an amount of 3 molecules in average or less per one hydroxyl group; and a polyol containing a sulfur atom, such as, di(2-hydroxyethyl) sulfide, 1,2-bis(2-hydroxyethylmercapto)ethane, bis(2-hydroxyethyl) disulfide, 1,4-dithiane-2,5-diol, bis(2,3-dihydroxypropyl) sulfide, tetrakis(4-hydroxy-2-thiabutyl)methane, bis(4-hydroxyphenyl)sulfone (trade name: bisphenol S), tetrabromobisphenol S, tetramethylbisphenol S, 4,4'-thiobis(6-tert-butyl-3-methylphenol) and 1,3-bis(2-hydroxyethylthioethyl)cyclohexane.

The monomer for forming the (thio)urethane resin has been known, and specific examples of the known publications that describe the monomer include JP-A-58-127914, JP-A-57-136601, JP-A-01-163012, JP-A-03-236386, JP-A-03-281312, JP-A-04-159275, JP-A-05-148340, JP-A-06-065193, JP-A-06-256459, JP-A-06-313801, JP-A-06-192250, JP-A-07-063902, JP-A-07-104101, JP-A-07-118263, JP-A-07-118390, JP-A-07-316250, JP-A-60-199016, JP-A-60-217229, JP-A-62-236818, JP-A-62-255901, JP-A-62-267316, JP-A-63-130615, JP-A-63-130614, JP-A-63-046213, JP-A-63-245421, JP-A-63-265201, JP-A-01-090167, JP-A-01-090168, JP-A-01-090169, JP-A-01-090170, JP-A-01-096208, JP-A-01-152019, JP-A-01-045611, JP-A-01-213601, JP-A-01-026622, JP-A-01-054021, JP-A-01-311118, JP-A-01-295201, JP-A-01-302202, JP-A-02-153302, JP-A-01-295202, JP-A-02-802, JP-A-02-036216, JP-A-02-058517, JP-A-02-167330, JP-A-02-270859, JP-A-03-84031, JP-A-03-084021, JP-A-03-124722, JP-A-04-78801, JP-A-04-117353, JP-A-04-117354, JP-A-04-256558, JP-A-05-78441, JP-A-05-273401, JP-A-05-093801, JP-A-05-080201, JP-A-05-297201, JP-A-05-320301, JP-A-05-208950, JP-A-06-072989, JP-A-06-256342, JP-A-06-122748, JP-A-07-165859, JP-A-07-118357, JP-A-07-242722, JP-A-07-247335, JP-A-07-252341, JP-A-08-73732, JP-A-08-092345, JP-A-07-228659, JP-A-08-3267, JP-A-07-252207, JP-A-07-324118 and JP-A-09-208651. The polyisocyanate compounds, the polyol compounds and the polythiol compounds described in these publications correspond to the (thio)urethane monomers in the present invention. A monomer forming the episulfide resin described later, and other monomers, such as, diethylene glycol allyl carbonate, may be added to these monomers for modifying the properties, including the heat resistance and the refractive index.

The monomer for forming the episulfide resin in the present invention may also be referred to as a monomer forming an epithio structure, and means a monomer having an episulfide group (epithio group) and a monomer mixture containing the monomer. Specific examples of the monomer having an episulfide group include an episulfide compound having an alicyclic structure, such as, 1,3- and 1,4-bis(β-epithiopropylthio)cyclohexane, 1,3- and 1,4-bis(β-epithiopropylthiomethyl)cyclohexane, bis(4-(β-epithiopropylthio) cyclohexyl)methane, 2,2-bis(4-(β-epithiopropylthio) cyclohexyl)propane and bis(4-(β-epithiopropylthio) cyclohexyl) sulfide; an episulfide compound having an aromatic structure, such as, 1,3- and 1,4-bis(β-epithiopropylthio)benzene, 1,3- and 1,4-bis(β-epithiopropylthiomethyl)benzene, bis(4-(β-epithiopropylthio)phenyl)methane, 2,2-bis(4-(β-epithiopropylthio)phenyl)propane, bis(4-(β-epithiopropylthio)phenyl) sulfide, bis(4-(β-epithiopropylthio)phenyl)sulfine and 4,4-bis(β-epithiopropylthio)biphenyl; an episulfide compound having a dithiane ring structure, such as, 2,5-bis(β-epithiopropylthiomethyl)-1,4-dithiane, 2,5-bis(β-epithiopropylthioethylthiomethyl)-1,4-dithiane, 2,5-bis(β-epithiopropylthioethyl)-1,4-dithiane and 2,3,5-tri (β-epithiopropylthioethyl)-1,4-dithiane; and an episulfide compound having an aliphatic structure, such as, 2-(2-(β-epithiopropylthioethylthio)-1,3-bis(3-epithiopropylthio) propane, 1,2-bis((2-β-epithiopropylthioethyl)thio)-3-(β-epithiopropylthio)propane, tetrakis(β-epithiopropylthiomethyl) methane, 1,1,1-tris(β-epithiopropylthiomethyl)propane and bis(β-epithiopropyl) sulfide.

The monomer forming the episulfide resin has been known, and specific examples of the known publications therefor include JP-A-09-071580, JP-A-09-110979, JP-A-09-255781, JP-A-03-081320, JP-A-11-140070, JP-A-11-183702, JP-A-11-189592, JP-A-11-180977 and JP-A-01-810575. The episulfide monomers described in these publications correspond to the episulfide monomers in the present invention. Other monomers for the transparent plastic substrate such as, a monomer for forming the (thio) urethane resin may be added for modifying the lens properties such as, the impact resistance and the processability.

In the present invention, a diethylene glycol bisallyl carbonate monomer as an optional component may be added to the monomer forming the (thio)urethane resin and/or the episulfide resin.

As the diethylene glycol bisallyl carbonate monomer, applicable are sole diethylene glycol bisallyl carbonate, and a monomer mixture containing diethylene glycol bisallyl carbonate and a monomer that is copolymerizable therewith. Specific examples of the copolymerizable monomer include an aromatic vinyl compound, such as, styrene, α-methylstyrene, vinyltoluene, chlorostyrene, chloromethylstyrene and divinylbenzene; a mono(meth)acrylate compound, such as, methyl (meth)acrylate, n-butyl (meth)acrylate, n-hexyl (meth)acrylate, cyclohexyl (meth)acrylate, 2-ethylhexyl (meth)acrylate, methoxydiethylene glycol (meth)acrylate, methoxypolyethylene glycol (meth)acrylate, 3-chloro-2-hydroxypropyl (meth)acrylate, stearyl (meth)acrylate, lauryl (meth)acrylate, phenyl (meth)acrylate, glycidyl (meth)acrylate and benzyl methacrylate; a mono(meth)acrylate compound having a hydroxyl group, such as, 2-hydroxyethyl (meth)acrylate, 2-hydroxypropyl (meth)acrylate, 3-hydroxypropyl (meth)acrylate, 3-phenoxy-2-hydroxypropyl (meth)acrylate and 4-hydroxybutyl (meth)acrylate; a di(meth)acrylate compound, such as, ethylene glycol di(meth) acrylate, diethylene glycol di(meth)acrylate, triethylene glycol di(meth)acrylate, polyethylene glycol di(meth)acrylate, 1,3-butylene glycol di(meth)acrylate, 1,6-hexanediol di(meth)acrylate, neopentyl glycol di(meth)acrylate, polypropylene glycol di(meth)acrylate, 2-hydroxy-1,3-di(meth)acryloxypropane, 2,2-bis(4-((meth)acryloxyethoxy)phenyl) propane, 2,2-bis(4-((meth)acryloxy.diethoxy)phenyl) propane and 2,2-bis(4-((meth)acryloxy.polyethoxy)phenyl) propane; a tri(meth)acrylate compound, such as, trimethylolpropane trimethacrylate and tetramethylolmethane trimethacrylate; a tetra(meth)acrylate compound, such as, tetramethylolmethane tetra(meth)acrylate (provided that the term (meth)acrylate in the description means methacrylate or acrylate); diallyl phthalate, diallyl isophthalate, diallyl terephthalate.

In the transparent plastic substrate of the present invention, in the case where the monomer having a thiourethane structure is used as a main component, the transparent plastic substrate is preferably polymerized from a raw material having a total mass of the polyisocyanate compound and the polythiol compound as the raw material monomers of 0.6 or more with respect to the total mass of the raw material monomers being 1.

In the case where the monomer forming the episulfide resin is used as a main component, the transparent plastic substrate is preferably polymerized from a raw material having an amount of the compound having an episulfide group as the raw material monomer of 0.6 or more with respect to the total mass of the raw material monomers being 1.

Examples of the production method of the transparent plastic substrate of the present invention include a method of mixing at least one kind of the benzotriazole compound selected from the formula (1) with, for example, a monomer forming a (thio)urethane resin and/or an episulfide resin, and then polymerizing the monomers. The polymerization method of the raw material monomer is not particularly limited, and in general, cast polymerization is employed. Specifically, at least one kind of the benzotriazole compound selected from the formula (1) may be mixed with the raw material monomer, and then the mixed liquid may be charged in a mold for forming a lens and heated to a temperature generally of from 20 to 150° C., thereby providing the transparent plastic substrate.

As another production method of the transparent plastic substrate of the present invention, such a method may also be employed that at least one kind of the benzotriazole compound selected from the formula (1) and an appropriate surfactant are dissolved or dispersed in water, and a transparent plastic substrate is immersed therein to infiltrate the transparent plastic substrate with the benzotriazole compound, thereby providing the transparent plastic substrate.

The mixed liquid of the benzotriazole compound represented by the formula (1) and the raw material monomer for the transparent plastic substrate may contain depending on necessity a polymerization catalyst described in JP-A-07-063902, JP-A-07-104101, JP-A-09-208621, JP-A-09-255781 and the like, and an assistant, such as, an internal releasing agent, an antioxidant, a fluorescent whitening agent and a bluing agent, described in JP-A-01-163012, JP-A-03-281312 and the like. The transparent plastic substrate obtained in the present invention may be subjected to a dyeing treatment using a colorant.

The transparent plastic member of the present invention contains the benzotriazole compound represented by the formula (1), and may have, for example, a functional layer, and preferably contains the transparent plastic substrate and a functional layer.

The transparent plastic member of the present invention is preferably a plastic lens, and more preferably a plastic lens for spectacles.

As the functional layer, at least one selected from a cured film, a primer layer, an antireflection film and a water repellent film may be exemplified.

Specifically, for enhancing the scratch resistance, a cured film may be formed on the transparent plastic substrate by using a coating liquid containing an organosilicon compound and fine particles of an inorganic material, such as, tin oxide, silicon oxide, zirconium oxide and titanium oxide. For enhancing the impact resistance, a primer layer containing a polyurethane as a main component may be provided. For imparting an antireflection function, an antireflection film may be formed by using silicon oxide, titanium dioxide, zirconium oxide, tantalum oxide and the like. For enhancing the water repelling property, a water repellent film may be formed on the antireflection film by using an organosilicon compound having a fluorine atom.

In the transparent plastic member of the present invention, the portion thereof that contains the benzotriazole compound represented by the formula (1) is not particularly limited, and the benzotriazole compound may be contained in any of the functional layer and the transparent plastic substrate. More specifically, the benzotriazole compound may be contained in any of the transparent plastic substrate, the cured film, the primer layer, the antireflection film, and the water repellent film.

The benzotriazole compound represented by the formula (1) is preferably contained in the transparent plastic substrate.

As a method for producing the transparent plastic member having the benzotriazole compound contained in the functional layer thereof, such a method may be employed that at least one kind of the benzotriazole compound selected from the formula (1), the resin components, and depending on necessity a solvent and the like are mixed to prepare a composition, and the composition is coated on at least one surface of a plastic lens substrate, and then cured to form the functional layer, thereby providing the transparent plastic member.

The transparent plastic member (or the transparent plastic substrate) of the present invention preferably has a cut rate of light in the blue region of from 380 to 500 nm of 35% or more, and more preferably 40% or more, and while not limited, preferably 60% or less, and more preferably 50% or less.

The cut rate of light having a wavelength of 410 nm is preferably 50% or more, and more preferably 60% or more.

The term transparent in the present invention means that a material is transparent to such an extent that the side therebehind can be viewed.

The transparent plastic substrate of the present invention preferably has a light transmittance in a wavelength range of from 400 to 700 nm of 70% or more, more preferably 80% or more, and further preferably 90% or more.

EXAMPLES

The present invention will be described specifically with reference to examples, but the present invention is not limited to the examples. A plastic lens will be described as an example of the transparent plastic member. The plastic lenses thus obtained were measured for the properties in the following manners.

(1) Measurement of Cut Rate of Light in Blue Region (Wavelength Range of from 380 to 500 nm)

The transmittances in a wavelength range of from 380 to 500 nm were measured with a spectrophotometer (U-4100, produced by Hitachi, Ltd.), and the cut rate of blue light was calculated from the transmittances (T) of every 10 nm according to the following expression.

$$\text{Blue light cut rate}(\%) = 100 - \frac{\sum_{380\,nm}^{500\,nm}(T)}{13}$$

(2) Measurement of Cut Rate at 410 nm

The light transmittance at a wavelength of 410 nm was measured with a spectrophotometer, and the cut rate of light was calculated according to the following expression.

Cut rate of light (%)=100−(transmittance at 410 nm)

Example 1

50.28 parts by mass of bis(isocyanatomethyl)bicyclo[2.2.1]heptane as a raw material monomer for a lens, 0.06 part by mass of dimethyltin dichloride as a catalyst, 0.15 part by mass of an acidic phosphate ester, JP-506H (produced by Johoku Chemical Co., Ltd.), as a releasing agent, and 1.90 parts by mass of 2-(3-tert-butyl-2-hydroxy-5-methylphenyl)-5-chloro-2H-benzotriazole as an ultraviolet ray absorbent were mixed by stirring, to which 25.50 parts by mass of pentaerythritol tetrakis(3-mercaptopropionate) and 24.22 parts by mass of 1,2-bis(2-mercaptoethylthio)-3-mercaptopropane as lens raw materials were then further added, and the components were mixed by stirring under a reduced pressure of 10 mmHg for 30 minutes, thereby preparing a monomer composition for a lens. The monomer composition for a lens was charged in a mold for molding a lens formed of a glass mold and a resin gasket (set to 0.00 D and thickness of 1.6 mm) provided in advance, and polymerized in an electric furnace at a temperature over 20° C. to 120° C. for 24 hours. After completing the polymerization, the gasket and the mold were removed, and the resulting molded article was heat-treated at 120° C. for 2 hours, thereby providing a transparent plastic lens.

The results obtained by measuring the resulting lens for the cut rate at 410 nm and the cut rate of blue light are shown in Table 1.

Examples 2 to 7 and Comparative Examples 1 and 2

Transparent plastic lenses were obtained in the same manner as in Example 1 except that the kinds and the amounts of the raw material monomer for a lens and the ultraviolet ray absorbent were changed as shown in Table 1.

The results obtained by measuring the resulting lenses for the cut rate at 410 nm and the cut rate of blue light are shown in Table 1.

Example 8

93.00 parts by mass of bis(β-epithiopropyl) sulfide and 1.00 part by mass of 2-hydroxyethyl methacrylate as raw materials for a lens, and 0.40 part by mass of 2-(3-tert-butyl-2-hydroxy-5-methylphenyl)-5-chloro-2H-benzotriazole as an ultraviolet ray absorbent were mixed by stirring, to which 6.00 parts by mass of n-butyl thioglycolate and 0.05 part by mass of tetra-n-butylphosphonium bromide as a catalyst were further added, and the components were mixed by stirring under a reduced pressure of 10 mmHg for 3 minutes, thereby preparing a monomer composition for a lens. The monomer composition for a lens was charged in a mold for molding a lens formed of a glass mold and a resin gasket (set to 0.00 D and thickness of 1.6 mm) provided in advance, and polymerized in an electric furnace at a temperature over 20° C. to 100° C. for 20 hours. After completing the polymerization, the gasket and the mold were removed, and the resulting molded article was heat-treated at 110° C. for 1 hour, thereby providing a transparent plastic lens.

The results obtained by measuring the resulting lens for the cut rate at 410 nm and the cut rate of blue light are shown in Table 1.

Example 9

90.00 parts by mass of methyl methacrylate and 10.00 parts by mass of ethylene glycol dimethacrylate as raw materials for a lens, 1.00 part by mass of 2-(3-tert-butyl-2-hydroxy-5-methylphenyl)-5-chloro-2H-benzotriazole as an ultraviolet ray absorbent, and 0.10 part by mass of azobisisobutyronitrile as a thermal polymerization initiator were mixed by stirring, and the components were well agitated at room temperature and then deaerated under a reduced pressure of 50 mmHg for 10 minutes. The monomer composition for a lens was charged in a mold for molding a lens formed of a glass mold and a resin gasket (set to 0.00 D and thickness of 1.6 mm) provided in advance, and polymerized in an electric furnace at a temperature over 40° C. to 85° C. for 24 hours. After completing the polymerization, the gasket and the mold were removed, and the resulting molded article was heat-treated at 100° C. for 2 hours, thereby providing a transparent plastic lens.

The results obtained by measuring the resulting lens for the cut rate at 410 nm and the cut rate of blue light are shown in Table 1.

Example 10

To 100 parts by mass of polycarbonate resin powder, which was obtained by polymerization by an ordinary interface polymerization of bisphenol A and phosgene, 1.00 part by mass of 2-(3-tert-butyl-2-hydroxy-5-methylphenyl)-5-chloro-2H-benzotriazole as an ultraviolet ray absorbent was added, sufficiently mixed with a tumbler mixer, and then formed into pellets with a vent-type twin screw extruder having a diameter of 30 mm at a temperature of 290° C. and a vacuum degree of 4.7 kPa. The resulting pellets were subjected to injection compression molding, thereby providing a transparent plastic lens.

The results obtained by measuring the resulting lens for the cut rate at 410 nm and the cut rate of blue light are shown in Table 1.

Comparative Example 3

A transparent plastic lens was obtained in the same manner as in Example 8 except that 0.40 part by mass of 2-(2-hydroxy-4-octyloxyphenyl)-2H-benzotriazole was used as an ultraviolet ray absorbent.

The results obtained by measuring the resulting lens for the cut rate at 410 nm and the cut rate of blue light are shown in Table 1.

TABLE 1

| | Lens raw material monomer/resin | (proportion in 100 parts by mass) | Ultraviolet ray absorbent | (part by mass) | Cut rate at 410 nm | Cut rate of blue light |
|---|---|---|---|---|---|---|
| Example 1 | M-1 | 50.28% | U-1 | 1.90 | 99% | 46% |
| | M-2 | 25.50% | | | | |
| | M-3 | 24.22% | | | | |
| Example 2 | M-1 | 50.28% | U-1 | 1.00 | 99% | 45% |
| | M-2 | 25.50% | | | | |
| | M-3 | 24.22% | | | | |
| Example 3 | M-4 | 52.02% | U-1 | 0.20 | 87% | 41% |
| | M-3 | 47.98% | | | | |
| Example 4 | M-5 | 47.54% | U-2 | 1.20 | 99% | 45% |
| | M-6 | 26.46% | | | | |
| | M-7 | 26.00% | | | | |
| Example 5 | M-5 | 47.54% | U-3 | 2.00 | 87% | 40% |
| | M-6 | 26.46% | | | | |
| | M-7 | 26.00% | | | | |
| Example 6 | M-5 | 47.54% | U-4 | 2.50 | 88% | 41% |
| | M-6 | 26.46% | | | | |
| | M-7 | 26.00% | | | | |
| Example 7 | M-4 | 52.02% | U-1 | 0.10 | 69% | 40% |
| | M-3 | 47.98% | | | | |
| Example 8 | M-8 | 93.00% | U-1 | 0.40 | 99% | 45% |
| | M-9 | 1.00% | | | | |
| | M-10 | 6.00% | | | | |
| Example 9 | M-11 | 90.00% | U-1 | 1.00 | 99% | 45% |
| | M-12 | 10.00% | | | | |
| Example 10 | M-13 | 100.00% | U-1 | 1.00 | 99% | 45% |
| Comparative Example 1 | M-1 | 50.28% | U-5 | 1.00 | 35% | 32% |
| | M-2 | 25.50% | | | | |
| | M-3 | 24.22% | | | | |
| Comparative Example 2 | M-4 | 52.02% | U-5 | 0.50 | 35% | 32% |
| | M-3 | 47.98% | | | | |
| Comparative Example 3 | M-8 | 93.00% | U-5 | 0.40 | 32% | 30% |
| | M-9 | 1.00% | | | | |
| | M-10 | 6.00% | | | | |

Each monomer or resin, and each ultraviolet absorbent shown in the table are as follows.

Monomer and Resin

M-1: bis(isocyanatomethyl)bicyclo[2.2.1]heptane
M-2: pentaerythritol tetrakis(3-mercaptopropionate)
M-3: 1,2-bis(2-mercaptoethylthio)-3-mercaptopropane
M-4: bis(isocyanatomethyl)benzene
M-5: bis(isocyanatomethyl)cyclohexane
M-6: pentaerythritol tetrakismercaptoacetate
M-7: 2,5-bismercaptomethyl-1,4-dithiane
M-8: bis(β-epithiopropyl) sulfide M-9: 2-hydroxyethyl methacrylate
M-10: n-butyl thioglycolate
M-11: methyl methacrylate
M-12: ethylene glycol dimethacrylate
M-13: polycarbonate resin
Ultraviolet Absorbents
U-1: 2-(3-tert-butyl-2-hydroxy-5-methylphenyl)-5-chloro-2H-benzotriazole
U-2: 2-(3-tert-butyl-2-hydroxy-5-ethylphenyl)-5-chloro-2H-benzotriazole
U-3: 2-(4-ethoxy-2-hydroxyphenyl)-5-chloro-2H-benzotriazole
U-4: 2-(4-butoxy-2-hydroxyphenyl)-5-chloro-2H-benzotriazole
U-5: 2-(2-hydroxy-4-octyloxyphenyl)-2H-benzotriazole While the plastic lenses are shown in the examples, the same effect can be obtained by providing a transparent plastic member containing the benzotriazole compound represented by the formula (1), for example, on a display screen of a personal computer, a mobile phone, a smartphone and the like.

The invention claimed is:

1. A plastic lens consisting essentially of:
    a transparent plastic substrate comprising:
        a resin component comprising a (thio) urethane resin obtained by reaction of bis(isocyanatomethyl)bicyclo [2.2.1] heptane, pentaerythritoltetrakis(3-mercaptopropionate), and 1,2-bis(2-mercaptoethylthio)-3-mercaptopropane;
        a benzotriazole compound in an amount of 0.10-2.00 parts by mass per 100 parts by mass of the resin component; and
    at least one a functional layer selected from a group consisting of a cured film, a primer layer, an antireflection film and a water repellent film,
        wherein the cured film is formed by a coating liquid comprising an organosilicon compound and one or more fine particles being selected from the group consisting of tin oxide, silicon oxide, zirconium oxide and titanium oxide, and
        wherein the transparent plastic substrate has a cut rate of light having a wavelength of 410 nm of 50% or more, and
        wherein the benzotriazole compound is at least one selected from 2-(3-tert-butyl-2-hydroxy-5-methylphenyl)-5-chloro-2H-benzotriazole and 2-(3-tert-butyl-2-hydroxy-5-ethylphenyl)-5-chloro-2H-benzotriazole.

2. The plastic lens according to claim 1, wherein the transparent plastic substrate has a cut rate of light in a wavelength range of from 380 to 500 nm of 35% or more.

3. The plastic lens according to claim 1, wherein the transparent plastic substrate has a cut rate of light having a wavelength of 410 nm of 60% or more.

* * * * *